Patented June 16, 1925.

1,542,541

UNITED STATES PATENT OFFICE.

HENRY DREYFUS, OF LONDON, ENGLAND.

MANUFACTURE OF CELLULOSE ETHERS.

No Drawing.   Application filed March 1, 1922. Serial No. 540,309.

*To all whom it may concern:*

Be it known that I, HENRY DREYFUS, a citizen of the Swiss Republic, of London, England, have invented certain new and useful Improvements in or Relating to the Manufacture of Cellulose Ethers, of which the following is a specification.

This invention relates to the manufacture of cellulose ethers by treatment of cellulose or cellulose conversion products (hereinafter included in the term cellulosic body) with etherifying agents in the presence of caustic alkali or other inorganic bases.

In the specifications of my previous applications for U. S. patents Serial Nos. 401381, 401383 Patent 1,451,330 and 401385 Patent 1,451,331 and in my British Patents 164374, 164375 and 164377 I have described processes for the manufacture of cellulose ethers by treatment of cellulose or cellulose conversion products with etherifying agents in the presence of caustic alkali, said processes being based upon restriction of the quantities of water in such a manner that the quantity of water present, whether contained in or added to the cellulose or conversion product before the etherification or added during the etherification procedure (disregarding water formed in the reaction itself) is not greater than from about the natural humidity content of the cellulose or conversion product up to about twice to four times the weight of the cellulose or conversion product, and preferably not in greater amount than about one-half to one and a half times this weight, the total alkali used in the whole etherification being such as would correspond to a solution of about 75–95 per cent by weight or more of alkali in the said limits of water quantity if the total alkali employed were dissolved in such a quantity of water, and in any case to a solution of not less than about 50 per cent by weight.

As explained in my said specifications the alkali used for the etherification may be largely or entirely introduced in a dry state, the cellulose or conversion product being first impregnated with limited quantities of water, or moisture alone, or with a solution of the alkali, and the alkali or the rest of the alkali being added in powdered form before the etherification or at intervals or stages or otherwise during the etherification, but preferably in stages so as to have only a small quantity of alkali each time and so aid in preventing depolymerization or degradation of the cellulose.

Further researches have confirmed the importance of restricting the quantity of water employed in the etherifying reaction and especially the fact that the more the quantity of water is reduced the more advantageously can the ethylating or other etherifying reaction be executed, as this enables very reduced quantities,—approaching to or being nearly theoretical—of alkali and diethyl sulphate or other etherifying agent to be employed, permits the reaction to be performed more quickly, and yields more valuable products.

According to the present invention for the manufacture of cellulose ethers by treatment of cellulose or cellulose conversion products with etherifying agents in presence of alkali or other inorganic bases, the total quantity of water employed,—whether as water, moisture or solution, and whether introduced before or during the etherification or before and during the etherification, but disregarding water formed in the process itself, is restricted to an amount between nil and about 100 per cent and preferably between nil and 25 to 50 per cent relatively to the weight of the cellulose or conversion products. Further according to the invention, for the purpose of effecting, in spite of such restriction of water, homogenous distribution and intimate union of the requisite alkali or base with the cellulose or conversion product and of enabling the etherification to be effected more quickly and with reduced quantities of alkali or base and etherifying agent, I employ,—for reducing or restraining the water within the said limits,—or preferably for taking out the water completely or nearly so,—while ensuring a close and intimate union or combination of the alkali or base with the cellulose or conversion products,—agents which are capable of combining chemically with water, viz. bodies which form, on contact with water, hydroxides or oxides, both of which are hereinafter included in the term "an oxygen containing metallic compound." Such bodies are for example sodium oxide, potassium oxide, calcium oxide, barium oxide, magnesium, calcium hydride, magnesium hydride, metallic calcium, barium or sodium, or (though perhaps less advantageous) sodamide or sodium ethylate powder. Such bodies can combine with and remove water from the cellulose or conversion product while enabling the alkali or base to become more intimately seated on or united to the cellulose, perhaps more chemically bound.

It is further to be understood in mentioning the limits of water above indicated, that relatively much larger amounts may be used, by employing the chemical binding agents to reduce the quantity of water. The ideal to aim at is that for the etherification the alkali should act in a very concentrated form on the cellulose and preferably, as far as may be, in about theoretical quantity, with a very restricted quantity of water or even no water, so that therefore also the etherification takes place so to say in the presence of little or no water.

The treatment with the water binding agents is preferably performed in the presence of diluents or solvents but preferably indifferent diluents such as benzol, toluol, carbon tetrachloride, ether, ligroin, benzine, etc.—to facilitate the incorporation and reaction and take up or distribute heat which may be generated. Correspondingly large quantities of diluent or solvent may be employed where the agents for removing water generate great quantities of heat in combining with the water, as for example in the case of alkali metals or alkali earth metals.

The etherification is also preferably performed in diluents or solvents to facilitate incorporation and reaction.

Cooling to any desired degree may be applied to prevent overheating by reason of heat generated by combination of the water with the water-removing agents, and cooling or strong cooling with brine may also be applied in the etherification, more especially in the case of very reactive etherifying agents, such for instance as dimethyl sulphate.

The compound formed by the water with the agent for removing water by chemical combination may with advantage serve as base for the etherification process, or as part of the base, but in some cases it may be employed only as water removing agent and not as the base.

When caustic alkali is used as base for the etherification process and the chemical agent used for combining with and removing water is of a nature to form such alkali by its hydration, as for example in the case of sodium oxide or potassium oxide, the cellulose or conversion product employed may be used in the natural state of humidity or impregnated with water alone in suitable quantity, or dilute or more or less concentrated alkali solutions, may be employed for the impregnation, while in the case of other chemical agents for combining with and removing water, a dilute or more or less concentrated solution of the alkali may be employed for impregnating or adding to the cellulose or conversion product, or this may contain or be treated first with a limited quantity of water and alkali and then with the chemical agent to remove water by chemical combination.

Although caustic soda or other alkali is preferably the base for the etherification process, other inorganic bases may be employed, and, as before mentioned, the compound formed by the water with the water-removing agent may serve for part or all of such other inorganic base.

When metal oxides, metal compounds or metals other than those of alkalies,—such as quicklime, calcium or other alkali earth metal oxides or alkali earth metals, magnesium, magnesium hydride and so forth,—are used for removing the water by chemical combination, and the resulting base serves partly or entirely for fixing or uniting to the cellulose or conversion product as base for the etherification, higher temperatures than those employed with caustic soda or like alkali as base may be employed for the etherification in view of the weaker character of the base.

One might consider that it could be possible to take the water out of the cellulose or conversion product by dry caustic alkali alone as explained in my said other applications. Caustic alkali has not, however, power to effect the removal of water from the cellulose or conversion product to the extent which is possible with the agents which bind water by chemical reaction, as on the one hand caustic alkali is already, from a chemical point of view, a body saturated with water, and on the other hand its affinity for water has only a certain limit at moderate temperatures; for example at ordinary temperature caustic alkali has only affinity for about an equal weight of water, corresponding to a solution of about 50–55% maximum concentration. Therefore, assuming the principle to be adopted of impregnating the cellulose with a limited amount of water, for example in the form of a 50% solution of caustic alkali, the saturation point for alkali is already nearly reached at ordinary temperature and the further alkali added in powdered form is not at once dissolved, but only goes gradually into solution in proportion as the other alkali is used up in the etherification.

On the other hand, even taking dry alkali to combine with cellulose having a normal humidity for example, the fact that the alkali reacts with the cellulose involves the formation of water; for example by the combination of 4 molecules of alkali with 1 molecule of cellulose $C_6H_{10}O_5$ nearly 50 per cent of water is formed relatively to the weight of the cellulose, if for example 4 molecules of alkali are used, while by employing the agents for binding water chemically this can be avoided to a very large extent, and the attraction of the water to such agents is much stronger and the alkali becomes intimately combined or united with the cellulose. Moreover, by employing such agents for removing water by chemical combination, this removal can be effected more efficiently than by heating with or without vacuum, without the extensive depolymerization or destruction of the cellulose which would occur with such a method.

By using agents such as those before mentioned, which combine chemically with the water, the reaction can be executed in such a form that all the alkali or base can be uniformly and intimately united with the cellulosic material with the introduction of little or even practically no water, and with the least depolymerization of the cellulose, as the treatment may be conducted with reduced quantities of alkali and at moderate or low temperatures.

The treatment with the agents for chemically combining with and removing water is preferably performed in benzol or other suitable diluents so as to enable the materials to be easily kneaded and mixed mechanically, and to distribute heat that may be generated by the reaction. Solvents may be used in some cases, but it is preferable to employ diluents.

The etherification is also preferably performed in such diluents or solvents.

The treatment with the water-combining and removing agents may precede the etherifying operation or may occur in or during the etherifying operation.

By means of the invention the quantities of alkali and etherifying agent required for effecting the etherification of the cellulose or cellulose derivative to any desired extent may be reduced very considerably, in fact even to approximately the quantities theoretically required.

Preferably the cellulosic bodies employed in performing the invention are cellulose or near conversion products thereof insoluble in dilute alkali at ordinary temperature, but alkali cellulose or alkali-soluble cellulose or cellulose derivatives may be employed and are likewise included in the term cellulosic body.

The manner in which the invention can be carried into effect may be illustrated by the following examples, it being understood that these are given as instances only and can be modified within wide limits.

*Example 1.*

162 parts by weight of cellulose (taken as $C_6H_{10}O_5$), impregnated with 25–36 parts of water, are well mixed or kneaded, preferably in benzol or like diluent, with 1½–2 molecules (about 93–124 parts) of sodium oxide, while strongly cooling with brine. The sodium oxide thus combines with the water to form about 3–4 molecules of caustic alkali and at the same time takes about 1½–2 molecules of water (25–36 parts) out of the cellulose, thus leaving practically no water in the cellulose. At the same time the caustic alkali becomes intimately united with the cellulose. After thus kneading or mixing for an hour or two, diethyl sulphate is kneaded in as etherifying agent, being added gradually or at intervals, or all at once. By way of example about 3–4 molecules of diethyl sulphate may be used. The temperature during the etherification should not exceed 60°–80° C. and may for example be kept at temperatures below about 55° C. The reaction may even with preference be executed at ordinary temperature or under strong cooling with brine and especially so when etherifying agents like dimethyl sulphate are used. The actual etherification may occupy about 1–4 hours for example.

*Example 2.*

162 parts by weight of cellulose (taken as $C_6H_{10}O_5$) impregnated with about 60–81 parts of water are well mixed or kneaded, preferably in benzol or like diluent, with three molecules (about 186 parts) of sodium oxide while strongly cooling with brine. The sodium oxide combines with the water to form about 6 molecules of caustic soda, and at the same time takes about three molecules of water (54 parts) out of the cellulose, thus leaving in less than 25% of water relatively to the cellulose. At the same time the caustic alkali becomes intimately united with the cellulose. After thus kneading or mixing for an hour or two, diethyl sulphate is kneaded in, being added gradually or at intervals, or all at once, to an amount of about 3–5 molecules for example. The temperature during the etherification should not exceed 60°–80° C. and may for example be kept at temperatures below about 50° C. The reaction may even with preference be executed at ordinary temperature or with strong cooling by brine, and especially when etherifying agents like diamethyl sulphate are used. The actual etherification may occupy about 1–4 hours for example.

*Example 3.*

The materials, procedure and proportions are similar to Example 2, except that two molecules of sodium oxide are employed, corresponding to the formation of four molecules of caustic soda.

*Example 4.*

162 parts of cellulose ($C_6H_{10}O_5$) are impregnated with about 70 parts by weight of water and introduced into a diluent, such as benzol, and about 2 molecules (80 parts) of caustic soda powder are kneaded in. Then about 124 parts of sodium oxide (2 molecules) are well mixed or kneaded in, for an hour or two, while strongly cooling with brine, to keep the temperature down. The sodium oxide combines with water to form four further molecules of caustic soda, making about six molecules alkali in all, and removes water to an amount of about half the 70 parts present in the impregnated cellulose used. About 3 to 5 molecules of diethyl sulphate as etherifying agent may then be kneaded or mixed in at a temperature between about 50°–55° C. and ordinary temperature or lower or with strong cooling by brine; especially in the case of very reactive etherifying agents like dimethyl sulphate strong brine cooling may with advantage be employed.

*Example 5.*

The procedure and proportions may be the same as in the foregoing examples, using dimethyl sulphate as etherifying agent and employing strong cooling by brine or otherwise, so as to keep the temperature of etherification very low, for example at about 0° C. or lower.

*Example 6.*

162 parts of cellulose ($C_6H_{10}O_5$) are impregnated with about 81 to 160 parts of water and 80 to 160 parts of caustic soda. Calcium oxide is then mixed or kneaded in the mass (preferably in presence of a diluent such as benzol), in such proportion as to combine with and remove water totally or to the required extent, e. g. about 3 to 7 molecules or more of CaO, strong cooling by brine being applied during the operation. After thus kneading or mixing for an hour or two, the etherification may be effected with diethyl sulphate or other etherifying agents with or without addition of another one or two molecules of alkali powder.

The etherifying temperature observed in carrying out the invention may vary with the particular etherifying agents used, but usually with strong bases it should not exceed about 60°–80° C. and may even with preference be conducted at ordinary temperature or with cooling or strong cooling with brine and especially in the case of very reactive etherifying agents, as for example dimethyl sulphate. When however weaker bases are employed such as calcium oxide or hydroxide, higher etherifying temperatures may be employed than those with strong bases.

While the agents for combining with and removing water as hereinbefore mentioned are preferably added before the actual etherification is begun, it is to be understood that they may be added partly or entirely during the progress of the etherification, and that said agents may be added all at once or gradually, or at intervals during the etherification. Also that the etherification may be conducted in one operation or in stages as explained in my said previous specifications, the base or base-forming agent being added all at once or gradually or at different stages.

It is further to be understood that although the quantity of water present or employed in the cellulose or conversion product at the beginning is preferably limited as far as possible, yet more dilute solutions of alkali or base or larger quantities of water may be employed in view of the effectiveness with which water can be removed from the cellulose or conversion product by the chemical combining action of the sodium oxide or other agents referred to: it is obvious, however, that in this case larger quantities of agents for binding water chemically would be required to take away or restrict the water, so that there is no advantage in this.

What I claim and desire to secure by Letters Patent is:—

1. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by the employment of a substance capable of combining with and removing water by chemical reaction with formation of an oxygen containing metallic compound.

2. Process for the production of a cellulose ether by treatment of a cellulosic body with etherifying agent in presence of caustic soda, characterized in that the total quantity of water employed, disregarding that formed in the reaction itself, is restricted to an amount between nil and about 100 per cent. relatively to the weight of the cellulosic body, said restriction of water being effected by the employment of a substance capable of combining with and removing water by chemical reaction with formation of an oxygen containing metallic compound.

3. Process for the production of a cellulose ether by etherifying treatment of a cellulosic body, characterized in that the total quantity of water employed, disregarding that formed in the reaction itself, is restricted to an amount between nil and about 50 per cent. relatively to the weight of the cellulosic body, said restriction of water being effected by the employment of a substance capable of combining with and removing water by chemical reaction with formation of an oxygen containing metallic compound.

4. Process for the production of a cellulose ether by treatment of a cellulosic body with etherifying agent in presence of caustic soda, characterized in that the total quantity of water employed, disregarding that formed in the reaction itself, is restricted to an amount between nil and about 50 per cent. relatively to the weight of the cellulosic body, said restriction of water being effected by the employment of a substance capable of combining with and removing water by chemical reaction with formation of an oxygen containing metallic compound.

5. Process for the production of a cellulose ether by etherifying treatment of a cellulosic body, characterized by the employment of a substance capable of combining with water by chemical reaction with formation of an oxygen containing metallic compound, whereby water is removed so that the etherification is effected in presence of practically no water.

6. Process for the production of a cellulose ether by treatment of a cellulosic body with etherifying agent in presence of caustic soda, characterized by the employment of a substance capable of combining with water by chemical reaction and forming an oxygen containing metallic compound, whereby water is removed so that the etherification is effected in presence of practically no water.

7. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment of a metallic compound capable of combining with water to form metallic hydroxide and thereby removing water.

8. Process for the production of a cellulose ether by treatment of a cellulosic body with etherifying agent in presence of an alkali, characterized in that the total quantity of water employed, disregarding that formed in the reaction itself, is restricted to an amount between nil and about 100 per cent. relatively to the weight of the cellulosic body, said restriction of water being effected by the employment of a metallic compound capable of combining with water to form metallic hydroxide and thereby removing water.

9. Process for the production of a cellulose ether by treatment of a cellulosic body with etherifying agent in presence of an alkali, characterized by the employment of a metallic compound capable of combining with water to form metallic hydroxide, whereby water is removed so that the etherification is effected in presence of practically no water.

10. Process for the production of a cellulose ether by treatment of a cellulose body with etherifying agent in presence of caustic soda, characterized by the employment of a metallic compound capable of combining with water to form metallic hydroxide, whereby water is removed so that the etherification is effected in presence of practically no water.

11. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment, in the presence of an indifferent organic liquid, of a substance capable of combining with and removing water by chemical reaction with formation of an oxygen containing metallic compound.

12. Process for the production of a cellulose ether by etherifying treatment of a cellulosic body, characterized by the employment of a substance capable of combining with water by chemical reaction with formation of an oxygen-containing metallic compound, whereby water is practically entirely removed, so that the etherification is effected in presence of practically no water, said water removing agent being employed in presence of an indifferent organic liquid.

13. Process for the production of a cellulose ether by treatment of a cellulosic body with etherifying agent in presence of an alkali, characterized in that the total quantity of water employed, disregarding that formed in the reaction itself, is restricted to an amount between nil and about 100% relatively to the weight of the cellulosic body, said restriction of water being effected by the employment, in presence of an indifferent organic liquid, of a metallic compound capable of combining with and removing water by chemical reaction with formation of metallic hydroxide.

14. Process for the production of a cellulose ether by treatment of a cellulosic body with etherifying agent in presence of caustic soda, characterized by the employment of a metallic compound capable of combining with water to form metallic hydroxide, whereby water is removed so that the etherification is effected in presence of practically no water, said water removing agent being employed in presence of an indifferent organic liquid.

15. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment of a substance capable of combining with and removing water by chemical reaction with formation of an oxygen-containing metal compound, cooling being applied to counteract heat generated by the action of the water removing substance.

16. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment of a substance capable of combining with and removing water by chemical reaction with formation of an oxygen containing metal compound, said water removing agent being employed in presence of an indifferent organic liquid and cooling being applied to counteract heat generated by the action of the water removing agent.

17. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment of a metallic compound capable of combining with water to form metallic hydroxide, cooling being applied to counteract heat generated by the action of the water removing compound.

18. Process for the production of a cellulose ether by treatment of a cellulosic body with etherifying agent in presence of caustic soda, characterized in that the total quantity of water employed, disregarding that formed in the reaction itself, is restricted to an amount between nil and about 100 per cent. relatively to the weight of the cellulosic body, said restriction of water being effected by the employment of a metallic compound capable of combining with water to form metallic hydroxide, cooling being applied to counteract heat generated by the water removing compound.

19. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment of a substance capable of combining with and removing water by chemical reaction with formation of an oxygen containing metallic compound, said metallic compound serving as inorganic base in association with the cellulosic body.

20. Process for the production of a cellulose ether by treatment of a cellulosic body with etherifying agent in presence of alkali as inorganic base, characterized in that the total quantity of water employed, disregarding that formed in the reaction itself, is restricted to an amount between nil and about 100% relatively to the weight of the cellulosic body, said restriction of water being effected by the employment of a substance capable of combining with and removing water by chemical reaction with formation of an oxygen-containing metallic compound, said metallic compound serving at least as part of the inorganic base in association with the cellulosic body.

21. Process for the prduction of a cellulose ether by treatment of a cellulosic body with etherifying agent in presence of caustic soda as inorganic base, characterized in that the total quantity of water employed, disregarding that formed in the reaction itself, is restricted to an amount between nil and about 100% relatively to the weight of the cellulosic body, said restriction of water being effected by the employment of sodium oxide, the sodium hydroxide formed by the water removing reaction serving at least as part of the inorganic base in association with the cellulosic body.

22. Process for the production of a cellulose ether by etherifying treatment of a cellulosic body, characterized, by the employment of a substance capable of combining with water with formation of an oxygen-containing metal compound, whereby water is removed so that the etherification is effected in presence of practically no water, said oxygen-containing metal compound formed by the water removing reaction serving as inorganic base in association with the cellulosic body.

23. Process for the production of a cellulose ether by treatment of a cellulosic body with etherifying agent in presence of caustic soda as inorganic base, characterized, by the employment of sodium oxide, whereby water is removed with formation of sodium hydroxide, so that the etherification is effected in presence of practically no water, the sodium hydroxide formed in the water removing reaction serving at least as part of the inorganic base for the etherification.

24. Process for the production of a cellulose ether by etherifying treatment of a cellulosic body, characterized in that the total quantity of water employed, disregarding that formed in the reaction itself, is restricted to an amount between nil and about 100 per cent. relatively to the weight of the cellulosic body, said restriction of water being effected by the employment, in presence of an indifferent organic liquid, of a substance capable of combining with and removing water by chemical reaction with formation of an oxygen-containing metallic compound, said metallic compound serving as inorganic base in association with the cellulosic body.

25. Process for the production of a cellulose ether by treatment of a cellulosic body with etherifying agent in presence of caustic soda as inorganic base, characterized in that the total quantity of water employed, disregarding that formed in the reaction itself, is restricted to an amount between nil and about 100 per cent. relatively to the weight of the cellulosic body, said restriction of water being effected by the employment of sodium oxide in presence of an indifferent organic liquid, the sodium hydroxide formed by the water removing reaction serving at least as part of the inorganic base.

26. Process for the production of a cellulose ether by etherifying treatment of a cellulosic body, characterized by the employment in presence of an indifferent organic liquid of a substance capable of combining with water with formation of an oxygen-containing metal compound, whereby water is removed, so that the etherification is effected in presence of practically no water, said oxygen-containing metal compound formed by the water removing reaction serving as inorganic base in association with the cellulosic body.

27. Process for the production of a cellulose ether by treatment of a cellulosic body with etherifying agent in presence of caustic soda as inorganic base, characterized by the employment of sodium oxide in presence of an indifferent organic liquid, whereby water is removed so that the etherification is effected in presence of practically no water, the sodium hydroxide formed by the water removing reaction serving at least as part of the inorganic base in association with the cellulosic body.

28. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by the employment in presence of an indifferent organic liquid, of a substance capable of combining with and removing water by chemical reaction with formation of an oxygen-containing metallic compound, said metallic compound serving as inorganic base in association with the cellulosic body, cooling being applied to counteract heat generated by the action of the water removing substance.

29. Process for the production of a cellulose ether by treatment of a cellulosic body with etherifying agent in presence of caustic soda as inorganic base, characterized in that the total quantity of water employed, disregarding that formed in the reaction itself, is restricted to an amount between nil and about 100 per cent relatively to the weight of the cellulosic body, said restriction of water being effected by the employment of sodium oxide in presence of an indifferent organic liquid, the sodium hydroxide formed by the water removing reaction serving at least as part of the inorganic base, cooling being applied to counteract heat generated by the action of the sodium oxide.

30. Process for the production of a cellulose ether by etherifying treatment of a cellulosic body, characterized by the employment, in presence of an indifferent organic liquid, of a substance capable of combining with water with formation of an oxygen containing metal compound, whereby water is removed, so that the etherification is effected in presence of practically no water, said oxygen containing compound formed by the water removing reaction serving as inorganic base in association with the cellulosic body, cooling being applied to counteract heat generated by the action of the water removing compound.

31. Process for the production of a cellulose ether by treatment of a cellulosic body with etherifying agent in presence of caustic soda as inorganic base, characterized by the employment of sodium oxide in presence of an indifferent organic liquid, whereby water is removed so that the etherification is effected in presence of practically no water, the sodium hydroxide formed by the water removing reaction serving at least as part of the inorganic base in association with the cellulosic body.

32. Process for the production of a cellulose ether by treatment of a cellulosic body with etherifying agent in presence of an alkali, characterized in that the total quantity of water employed, disregarding that formed in the reaction itself, is restricted to an amount between nil and about 100 per cent relatively to the weight of the cellulosic body, said restriction of water being effected by the employment of a substance capable of combining with and removing water by chemical reaction with formation of an oxygen-containing metallic compound, an approximately quantitative yield of cellulose ether being thereby obtained with about theoretical quantities of alkali and etherifying agent.

33. Process for the production of a cellulose ether by treatment of a cellulosic body with etherifying agent in presence of an alkali, characterized by the employment of a metal compound capable of combining with water with formation of metallic hydroxide, whereby water is removed, so that the etherification is effected in presence of practically no water, an approximately quantitative yield of cellulose ether being thereby obtained with about theoretical quantities of alkali and etherifying agent.

34. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body said restriction of water being effected by the employment of a substance capable of combining with and removing water by chemical reaction with formation of an oxygen containing metallic compound, and that the etherification is conducted at temperatures not higher than about 80° C.

35. Process for the production of a cellulose ether by treatment of a cellulosic body with etherifying agent in presence of caustic alkali, characterized in that the total quantity of water employed, disregarding that formed in the reaction itself, is restricted to an amount between nil and about 100 per cent. relatively to the weight of the cellulosic body, said restriction of water being effected by the employment of a metallic compound capable of combining with and removing water by chemical reaction with formation of metallic hydroxide, and that the etherification is conducted at temperatures below about 80° C.

36. Process for the production of a cellulose ether by etherifying treatment of a cellulosic body, characterized in that the total quantity of water employed disregarding that formed in the reaction itself, is restricted to an amount between nil and about 100 per cent. relatively to the weight of the cellulosic body, said restriction of water being effected by removing water from the cellulosic body, before etherification, by treating with a substance capable of combining with water with formation of an oxygen containing metallic compound.

37. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating with a metallic compound capable of combining with water with formation of metallic hydroxide.

38. Process for the production of a cellulose ether by treatment of a cellulosic body with etherifying agent in presence of an alkali, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating with a metallic compound capable of combining with water with formation of metallic hydroxide.

39. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating with a substance capable of combining with water with formation of an oxygen-containing metallic compound, said metallic compound serving as inorganic base in association with the cellulosic body for the etherification.

40. Process for the production of a cellulose ether by treatment of a cellulosic body with etherifying agent in presence of caustic soda as inorganic base, characterized in that the total quantity of water employed, disregarding that formed in the reaction itself, is restricted to an amount between nil and about 100 per cent. relatively to the weight of the cellulosic body, said restriction of water being effected by removing water from the cellulosic body, before etherification, by treating with sodium oxide, the sodium hydroxide thus formed serving at least as part of the inorganic base in association with the cellulosic body for the etherification.

41. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating in presence of an indifferent organic liquid, with a substance capable of combining with water with formation of an oxygen containing metallic compound.

42. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating with a substance capable of combining with water with formation of an oxygen containing metallic compound, cooling being applied to counteract heat generated by the action of the water removing substance.

43. Process for the production of a cellulose ether by etherifying treatment of a cellulosic body, characterized in that the total quantity of water employed, disregarding that formed in the reaction itself, is restricted to an amount between nil and about 100 per cent relatively to the weight of the cellulosic body, said restriction of water being effected by removing water from the cellulosic body, before etherification, by treating in presence of an indifferent organic liquid, with a substance capable of combining with water, with formation of an oxygen containing metallic compound, cooling being applied to counteract heat generated by the action of the water removing substance.

44. Process for the production of a cellulose ether by treatment of a cellulosic body with etherifying agent in presence of an alkali as inorganic base, characterized in that the total quantity of water employed, disregarding that formed in the reaction itself is restricted to an amount between nil and about 100 per cent relatively to the weight of the cellulosic body, said restriction of water being effected by removing water from the cellulosic body, before etherification, by treating in presence of an indifferent organic liquid, with a metallic compound capable of combining with water with formation of metallic hydroxide, cooling being applied to counteract heat generated by the action of the water removing compound.

In testimony whereof I have hereunto subscribed my name.

HENRY DREYFUS.